2 Sheets—Sheet 1.

E. F. SCHOLDER.

TRUCK.

No. 11,022. Reissued Aug. 13, 1889.

*Witnesses:*
Wm H Bates
J O Higden

*Inventor:*
Edward F Scholder

E. F. SCHOLDER. 2 Sheets—Sheet 2.

TRUCK.

No. 11,022. Reissued Aug. 13, 1889.

Witnesses:
Wm. H. Bates
J. C. Higdon

Inventor:
Edward F. Scholder.

UNITED STATES PATENT OFFICE.

EDWARD F. SCHOLDER, OF FORT SCOTT, KANSAS.

TRUCK.

SPECIFICATION forming part of Reissued Letters Patent No. 11,022, dated August 13, 1889.

Original No. 387,741, dated August 14, 1888. Application for reissue filed February 6, 1889. Serial No. 298,936.

*To all whom it may concern:*

Be it known that I, EDWARD FERDINAND SCHOLDER, a citizen of the United States, residing at Fort Scott, in the county of Bourbon and State of Kansas, have invented a new and useful Improvement in Trucks, of which the following is a specification.

My invention relates to an improvement in trucks adapted particularly for hauling manure on farms, and also adapted to be used for hauling earth when making excavations, and to be converted into a truck for hauling fodder and gathering corn. It consists in the peculiar construction and combination of devices that will be more fully set forth hereinafter, and particularly pointed out in the claims.

Figure 1:
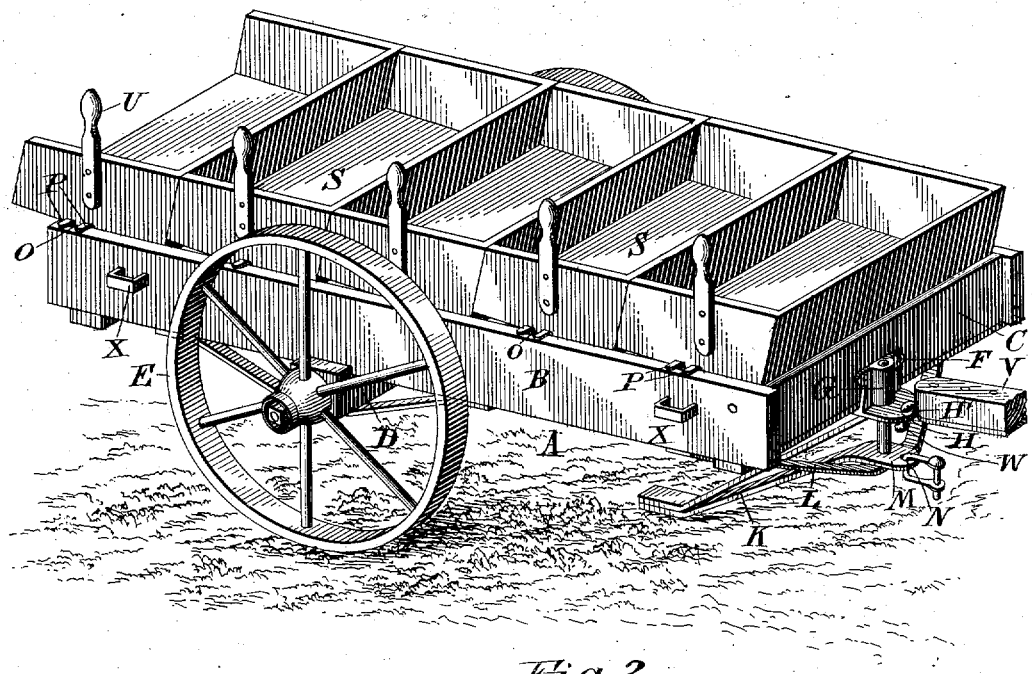
Figure 2:
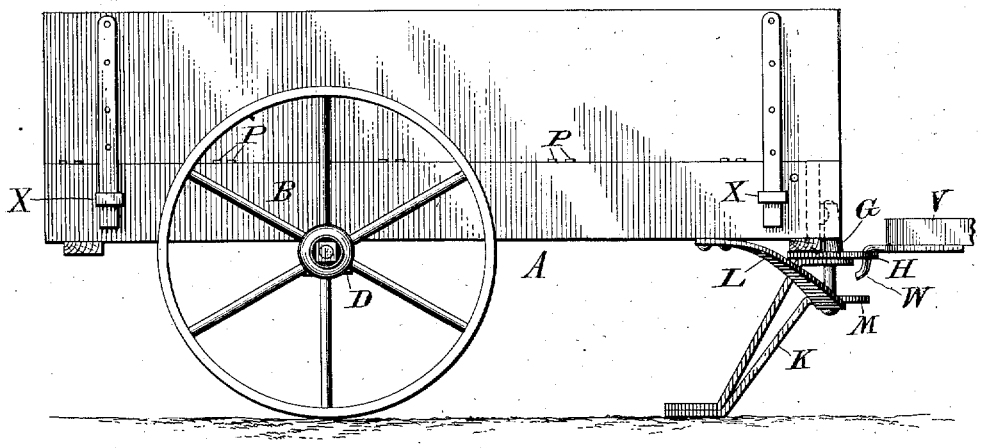
Figure 3:
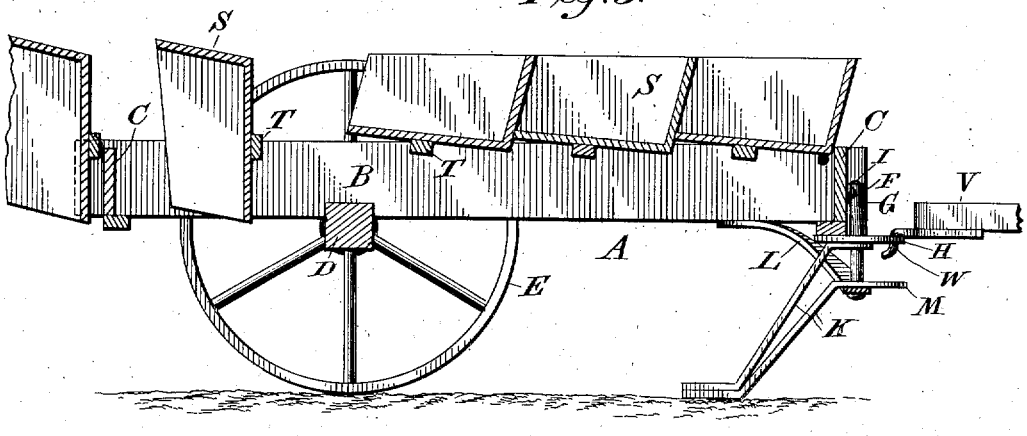
Figure 4:
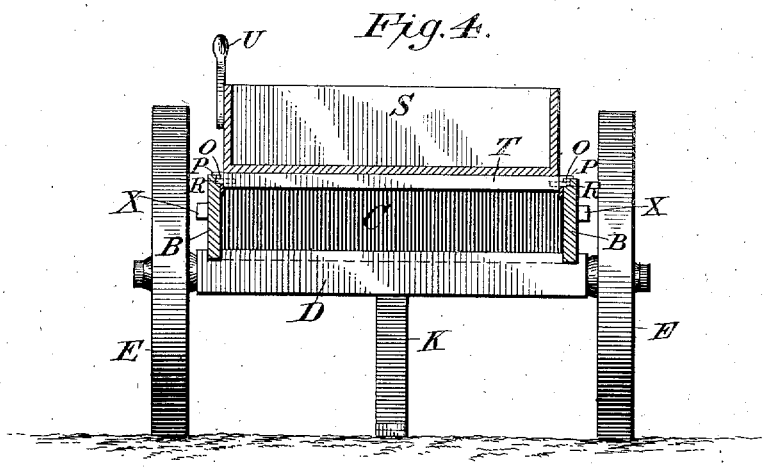

In the drawings, Figure 1 is a perspective view of a truck embodying my improvements when the same is adapted for use in hauling manure or earth. Fig. 2 is an elevation of the same when the truck is adapted to gathering corn or hauling similar substances. Fig. 3 is a vertical longitudinal sectional view of my improved truck when arranged to haul and dump manure or earth. Fig. 4 is a vertical transverse sectional view of the same.

A represents a rectangular frame of suitable length and breadth, which comprises the longitudinal side beams B and the front and rear connecting-beams C. Arranged under the frame, near the center thereof and somewhat nearer the rear end of the frame, is an axle D, which is rigidly secured to the same, and is provided with supporting-wheels E. At the front end of the same, and secured to the under side of the front cross-bar C, at the center thereof, is a bracket F, having a vertical sleeve G, and provided at its lower side with a horizontal bracket H, which projects forward and rearward therefrom, the rear end of said bracket being bolted to the under edge of the cross-bar C and the front edge of said bracket being provided with an opening H′.

I represents a vertical pivotal bolt, which extends through the sleeve G and depends therefrom, and on the said pivotal bolt is a trailing arm or support K, the lower rear end of which is adapted to rest on the ground, and thereby support the front end of the frame and arrange the latter in a slightly-inclined position.

A brace or yoke L has its central portion secured to the lower end of bolt I, and has its ends bolted to the sides of the frame at a suitable distance from the front end thereof. The said trailing arm K is provided in advance of the pivotal bolt with a projecting ear M, which is provided with an opening N, to which a suitable whiffletree is attached.

In upper edges of the side beams B, on the inner sides of the same, are vertical open slots O, the said slots being covered by wear-plates P, which are screwed or bolted to the inner sides of the beams B and form bearings for the projecting trunnions R of a series of dump-hoppers S, the said hoppers having inclined bottoms, vertical end walls, inclined rear and front sides, and having their rear sides entirely open, as shown. Said hoppers are arranged one in rear of the other throughout the length of the frame and have their trunnions journaled in the slotted bearings O, the front closed sides of each hopper bearing against the inclined rear sides of the hopper in advance thereof, and said hoppers being thereby supported in a slightly-inclined position. The trunnions project from the ends of bars T, which are arranged under the bottoms of the hoppers, slightly in the rear of the centers thereof, as shown, whereby the preponderating weight of the contents of the hoppers and of the hoppers themselves will be in front of their trunnions, thereby keeping the said hoppers with their opposing sides in contact with each other, and consequently maintaining the hoppers normally in equilibrium. The said hoppers are each provided at one end with a vertical standard or handle U, by means of which the hoppers may be dumped, so as to discharge them of their contents to the rear, as will readily be understood.

V represents a tongue or shaft having a hoop W at its rear end adapted to engage in the openings in the bracket H, and thereby connect the tongue to the front end of the truck. On the outer sides of the beams B are keepers X, in which the standards of the wagon bed or rack may be secured when the dump-hoppers are removed from the frame, and the truck is adapted to any use that the ordinary farm-wagon is adapted to.

A truck thus constructed is extremely cheap and simple, is very strong and durable, is very readily operated, and will be found of great utility by farmers, street commissioners in cities, and others. The wheels E are of small diameter, and thereby the body of the truck is supported at only a slight distance above the ground, thus rendering it exceedingly easy to load and unload the truck.

Having thus described my invention, I claim—

1. The combination of the frame and the series of hoppers pivoted on the frame, the said hoppers having their front and rear sides inclined, the front side of one hopper resting against and closing the rear side of the next adjacent hopper, as set forth.

2. The truck having the supporting-wheels E mounted at a suitable distance in the rear of center thereof, and provided at its front end with a pivoted trailing support, substantially as described.

3. The combination, in a truck, of the frame having the supporting-wheels E and provided at its front end with the pivoted trailing support having the ear M, adapted to receive a whiffletree, and the tongue or shaft having the hook engaging the bracket or plate at the front end of the frame, substantially as described.

4. The combination, in a truck, of a frame having the bearings P in its sides and the hoppers having the trunnions engaging the said bearings, the said hoppers being provided with the standards U, substantially as described.

In testimony that I claim the foregoing as my own I have hereto affixed my signature in the presence of two witnesses.

EDWARD F. SCHOLDER.

Witnesses:
WM. S. HOLMAN,
B. W. PERKINS.